March 1, 1949.    E. B. DUNKAK    2,462,952
SOLAR ACTIVATED DEHUMIDIFIER
Filed Aug. 3, 1945    2 Sheets-Sheet 1
Fig. 1.
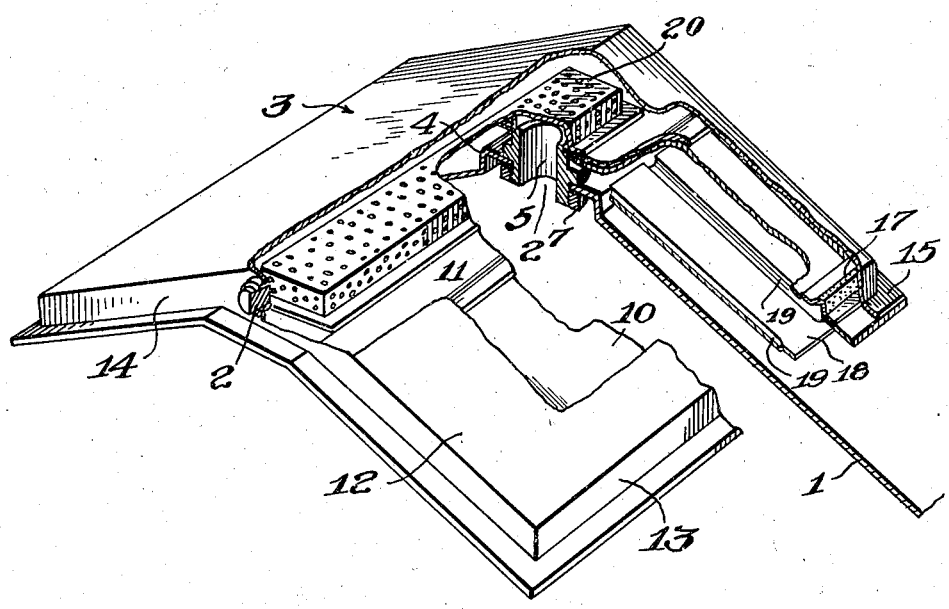
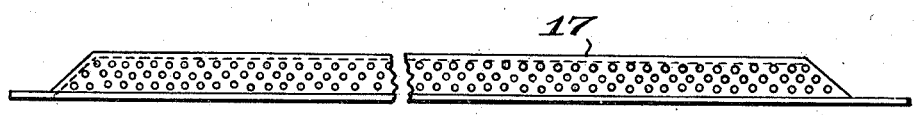
Fig. 2
INVENTOR.
ELMER B. DUNKAK
BY
Semmes, Keegin, Beale & Semmes
attys

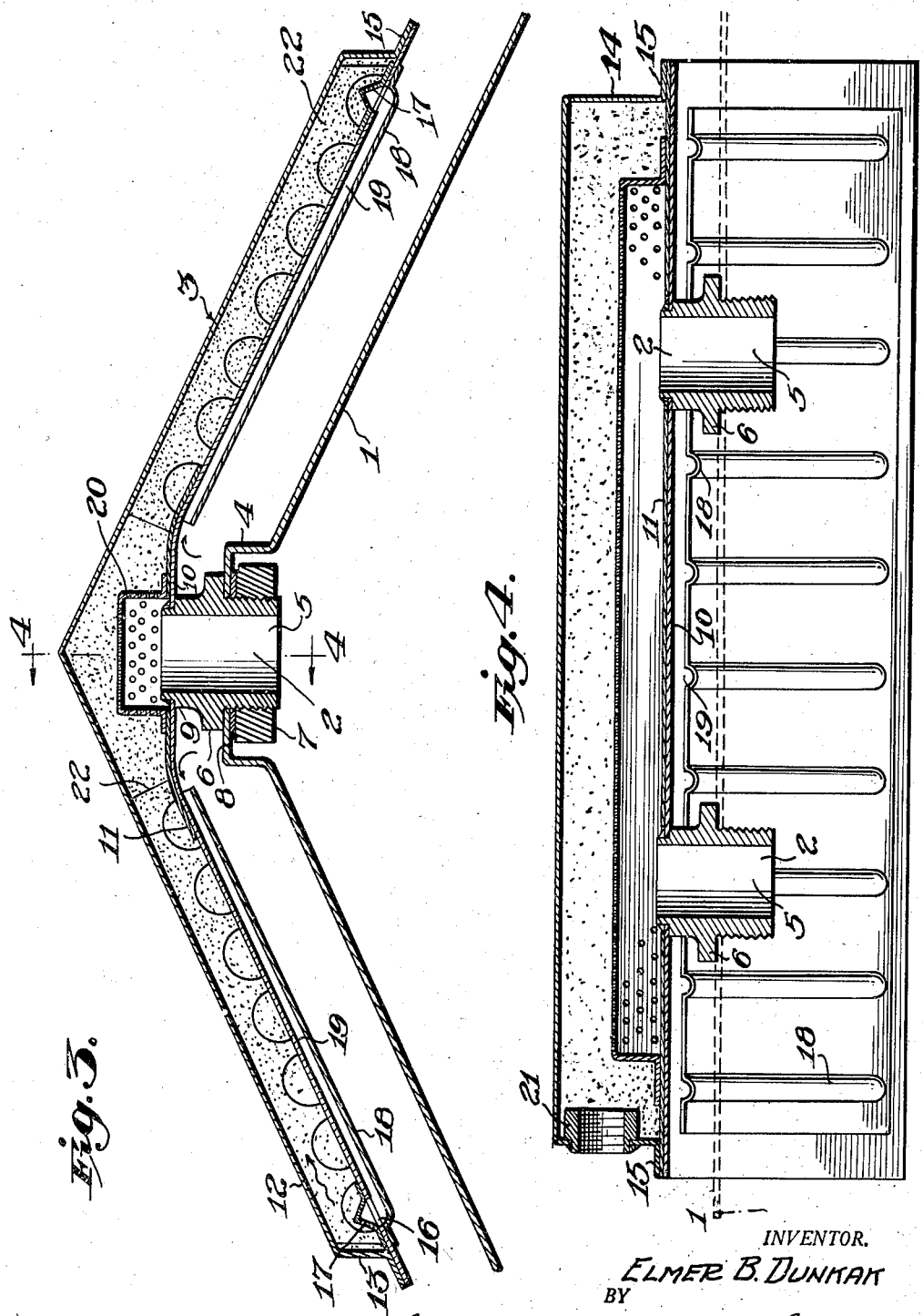

Patented Mar. 1, 1949

2,462,952

UNITED STATES PATENT OFFICE 2,462,952

SOLAR ACTIVATED DEHUMIDIFIER

Elmer B. Dunkak, Baltimore, Md., assignor to The Davison Chemical Corporation, Baltimore, Md.

Application August 3, 1945, Serial No. 608,767

5 Claims. (Cl. 183—4.5)

This invention relates in general to the heat activation of moisture adsorbing material and more particularly has reference to the solar heat activation of silica gel.

Desiccant substances such as silica gel will take up moisture from the surrounding atmosphere until equilibrium of the moisture in the atmosphere and desiccant is reached. When the desiccant has taken up this much moisture it must be replaced or reactivated. Regeneration by activation is generally effected by passing hot gases in contact with the material or by heating the same. Heat for reactivation is generally supplied by burners or electrical heating devices and involves an appreciable financial expenditure. Also the desiccant must be removed from its location of use for purposes of activation. The present invention provides for the activation or reactivation of desiccants such as silica gel by solar radiations.

An object of this invention is to provide an apparatus for the solar activation of a dessiccant such as silica gel.

Another object of this invention is to provide an enclosure breather dehumidifier constructed for the solar activation of the desiccant therein.

With these and other objects in view, the present invention resides in the parts and combinations hereinafter described and shown in the drawings.

In the drawings:

Figure 1 is a perspective view of a breather dehumidifier embodying the features of the present invention.

Figure 2 is a detailed sectional view of the lower screen element of the device of Figure 1.

Figure 3 is a transverse vertical sectional view of the device of Figure 1.

Figure 4 is another vertical sectional view taken on line 4—4 of Figure 3.

The present invention is based upon the concept of utilizing solar heat directly or heat obtained from radiations of the sun for activating or reactivating a desiccant such as silica gel.

Under certain conditions, the direct rays of the sun may be employed for the activation of a desiccant such as silica gel. According to the present invention, it has been found that a desiccant such as silica gel may be activated by spreading the gel in granular form upon a dark, dull, heat absorbing surface in a thin layer and exposing same to the rays of the sun. The rays of the sun can be concentrated upon the gel and dark, dull, heat absorbing surface by lenses or reflectors.

It is also within the concept of the present invention to place the silica gel in a receptacle, the wall or walls of which are formed of material having high thermal conductivity and the exterior surfaces of which are of a dark, dull finish, and then subjecting the receptacle to solar radiations. To facilitate transfer of heat from the walls of the receptacle to the silica gel contained therein, elements of high thermal conductive material may extend inwardly from the walls into the interior space.

The concept of the present invention is particularly applicable to the activation or reactivation of a desiccant in a breather dehydrator.

The air in any enclosure has a varying density when subjected to ambient temperature and pressure conditions such as are encountered in the storage of packages exposed to the elements. In the case of hermetically sealed enclosures the varying density will cause a variable pressure inside the enclosure which is independent of the atmospheric pressure but is proportional to the absolute temperature. If the enclosure is vented, however, a cyclic flow of air into and out of the enclosure will occur due to increments of pressure differential between the enclosed space and the atmosphere. This cyclic flow is termed breathing and its magnitude and rate depend on the range and rate of atmospheric pressure and temperature change.

In order to maintain the air within the vented enclosure at a low relative humidity, a device such as shown in the drawings is associated with the vent opening. As illustrated, the enclosure 1 provided with one or more vents or breather openings 2 has a dehumidifying device indicated generally by reference character 3 mounted thereon. The enclosure may be a tank, a container or housing of any desired type, the contents of which are to have moisture excluded therefrom. Although the enclosure may have any location, in order to render the present invention most effective, it should be exposed so that it can receive the radiations of the sun.

Preferably, the upper portion of the enclosure 1 is provided with a boss 4 surrounding each of the openings 2. Fitted into the openings 2 is a section of pipe or nipple 5 provided with a laterally extending flange 6. The flange 6 is adapted to seat upon the upper portion of the boss 4 and the lower threaded portion of the nipple 5 has a nut 7 mounted thereon which serves to draw the flange 6 against the upper portion of the boss 4. A washer or gasket 8 may be interposed between the nut 7 and the inner surface of the boss 4. Of course, a washer or gasket may also be interposed between flange 6 and the upper portion of the boss 4.

Fitting 5 serves as a mounting for the dehumidifying device indicated generally by reference character 3. As illustrated, the upper portion of the fitting 5 is cut away to form a shoulder 9 which receives a base plate 10 of the dehumidifying device. The cut-away portion of the fitting 5 extends through an opening in the base plate 10, and the plate and fitting are secured together rigidly by welding. In order to reinforce the base plate and to impart rigidity thereto, a reinforcing plate 11 is positioned thereon about the opening which receives the fitting 5.

Mounted upon the base plate 10 is a cover plate 12 which is shaped as illustrated in the drawings to provide a housing between the same and the base plate 10. As shown, the cover plate 12 is provided with side portions 13 and end portions 14, both of which have outwardly extending flanges 15 at the lower extremities thereof. These flanges may be welded or otherwise joined to the coextensive portions of the base plate 10 to form a receptacle for the desiccant. In the base plate 10 adjacent each side thereof there is provided an opening 16 placing the interior of the receptacle formed between the plates 10 and 12 in communication with the atmosphere. Positioned in the receptacle 3 over the openings 16 are screens 17 which are formed of sheet metal provided with a plurality of perforations of a fineness that will permit the free flow of air therethrough while retaining the desiccant in the dehumidifying device 3.

Normally a desiccant such as silica gel in a receptacle such as that indicated by reference character 3 will absorb moisture by infiltration from the surrounding atmosphere even when there is no flow of air from the exterior through the receptacle. It has been found that if the air passage from the atmosphere to the interior of the receptacle containing the silica gel has a length equal to or greater than ten times the diameter or cross section of the passage, the infiltration of moisture from the external air to the interior of the receptacle is minimized to a negligible degree. For this purpose, the opening 16 in the bottom of the plate 10 adjacent each side thereof which is in the form of a slot, is covered by a diffusion plate 18 which is provided with a plurality of semi-cylindrical grooves or embossed portions to provide channels 19 extending from the slot 16 to the inner edge of the plate 18 as illustrated in Figures 1 and 3 of the drawings. The length to cross sectional area of the passages 19 bears the ratio as above pointed out so as to minimize the diffusion of moisture from the external atmosphere to the desiccant in the receptacle 3.

A perforated screen 20 is mounted over the upper ends of the pipe sections or fittings 5 and serves to prevent the flow of the desiccant material into the interior of the enclosure 1 while permitting the free flow of air into and out of said enclosure.

In one end 14 of the cover plate there is provided a fitting 21 internally threaded to receive a plug for the closure thereof. This fitting serves as a means for the introduction and removal of the desiccant in the receptacle 3.

It has been found preferable to construct the receptacle 3 of sheet aluminum or other metal having a high thermal conductivity. The purpose of this is to insure a high rate of heat transfer from the exterior of the receptacle 3 through the walls thereof to the desiccant such as silica gel contained therein. Copper, bronze, steel or any other metal having a high thermal conductivity, may be employed in place of aluminum.

In accordance with the present invention, it has been found that by making the exterior surfaces of the receptacle approach as nearly as possible the surfaces of a black body, a considerable amount of heat will be absorbed by the walls of the receptacle when subjected to the radiations of the sun and transmitted to the interior thereof. As a matter of fact, the heat absorbed and transferred through the walls of the receptacle is sufficient to effect activation of a desiccant such as silica gel to remove moisture therefrom. When the receptacle is being subjected to the rays of the sun, the enclosure 1 is likewise being heated. There will be a tendency for the air in the enclosure 1 to move outwardly through vents 5, through the desiccant, to the opening 16 and through channels 19 to exterior atmosphere. This travel of the air from the enclosure 1 through the desiccant tends to carry along the moisture driven from the desiccant by the action of the solar heat transferred to the desiccant through the walls of the receptacle 3.

Upon reduction in temperature of the atmosphere or termination of exposure to the rays of the sun, the air in the enclosure 1 will cool and its pressure will drop. This will cause external air to be drawn through the channels 19 into the receptacle 3, through the activated desiccant silica gel and into the enclosure 1 to bring the pressure therein into equilibrium with the external atmosphere.

The dull black heat absorbing finish on the external surfaces of the plates 10, 12 and 18 may be in the form of a coating compound or in the case of the plates being formed of aluminum the surfaces may be anodized and dyed. If the plates are formed of copper, the oxidized surfaces will become a dull black. It is of course within the concept of the present invention to form the dull black surface of any suitable material and in any manner which will result in a surface having high solar heat absorbing properties. All of the external surfaces of the dehumidifier 3 are finished in dull black to pick up heat from reflected as well as from direct solar radiations.

To increase the transfer of heat from the plates 10 and 12 to the desiccant silica gel when in an activating cycle, a plurality of ribs 22 of metal are positioned between said plates as shown in Figure 3. These ribs may be welded to the plates 10 and 12 to increase the heat transfer. With this construction heat will be more effectively distributed from plates 10 and 12 into the mass of silica gel. Of course, other forms of heat conducting elements may extend inwardly from the walls into the gel bed.

An installation having a gel bed of about 1 inch in thickness and providing a flow path of about 10 inches was found very effective for a particular installation. The flow path and the thickness of the gel bed may of course be varied within wide limits depending upon the size of the enclosure to be vented and the atmospheric conditions.

A construction as shown and described has been found highly effective for maintaining the air in the interior of the enclosure at a low relative humidity and to also maintain the desiccant silica gel in a condition capable of absorbing moisture from external air drawn through the gel bed into the interior of the enclosure. When the device has a high exposure to the sun there will be greater activation of the silica gel. On the other hand, when there is little exposure to the sun, there will be little "breathing" of the air in the enclosure and little use of the silica gel as a desiccant. Thus, in either event, the silica gel will remain in activated condition ready to reduce the humidity of air drawn in from the external atmosphere.

In practice there are three operating conditions under which a breather must function, namely "breathing out," "static condition," and "breathing in."

The first named condition occurs whenever the air inside the enclosure is heated by any means whatsoever and also whenever the atmospheric pressure falls. This condition will be created most often when the enclosure is exposed to the sun's rays. As pointed out above, the receptacle 3 under this condition will heat up and drive out the moisture adsorbed previously and prepare it for the next "breathing in" operation.

The "static condition" exists whenever there is no change in temperature or pressure and therefore no flow of air into or out of the enclosure. The ducts 19 then function to prevent depletion of the silica gel.

The final operating condition "breathing in" is the reverse of the first condition and it occurs whenever the enclosed air is cooled and whenever the atmospheric pressure rises. Under this condition the prime function of the breather comes into use. The air being forced into the enclosure by a pressure differential must pass through the silica gel bed and give up its contained moisture to the gel and then pass into the enclosure as dry air. The moisture given up is held in the silica gel where it can do no damage, until exiting dry air picks it up on the next "breathing out" operation and discharges it to the atmosphere.

Although the physical shape of the dehumidifying device may be varied within wide limits, it has been found that the shape illustrated, i. e. like an open inverted book, is highly satisfactory. This shape provides a top surface most likely to shed rain and snow. Also the air inlet ends of the channels 19 are located at the apex of the underside where they are protected from the entry of wind borne particles of rain, snow and dust.

As before indicated, lenses and/or mirrors may be employed if desired or necessary to increase the heating effect of the sun's rays on the heat absorbing surfaces.

From the foregoing, it will be appreciated that a highly effective arrangement is provided to activate a desiccant such as silica gel by solar radiations and to maintain air in an enclosure at a low relative humidity.

I claim:

1. A device for mounting on a container from which moisture is to be excluded between a breather opening in the container and the external atmosphere comprising a receptacle having an opening communicating with the breather opening and an opening communicating with the external atmosphere, heat reactible desiccant material in said receptacle, the outer exposed surfaces of said receptacle being formed of solar heat absorbing material, and an unobstructed duct interposed between the external atmosphere and the opening communicating therewith, the length of said duct being at least ten times the internal diameter thereof to reduce to a minimum the diffusion of moisture through stagnant air in the duct.

2. A device for mounting on a container from which moisture is to be excluded between a breather opening in the container and the external atmosphere comprising a receptacle having an opening communicating with the breather opening and an opening communicating with the external atmosphere, heat reactible desiccant material in said receptacle, the walls of said receptacle being formed of heat conducting material and the outer surfaces thereof having high solar heat absorbing properties, heat conducting elements extending inwardly from the walls of said receptacle to conduct heat from said walls to the desiccant material, and an unobstructed duct interposed between the external atmosphere and the opening communicating therewith, the length of said duct being at least ten times the internal diameter thereof to reduce to a minimum the diffusion of moisture through stagnant air in the duct.

3. A device for mounting on a container from which moisture is to be excluded between a breather opening in the container and the external atmosphere comprising a receptacle having an opening communicating with the breather opening and a second opening communicating with the external atmosphere, a desiccant material in the receptacle between the two openings, and an unobstructed duct interposed between the external atmosphere and the second opening, said duct having a length at least ten times its diameter whereby diffusion of moisture into the desiccant is reduced to a minimum.

4. A device for mounting on a container from which moisture is to be excluded between a breather opening in the container and the external atmosphere comprising a flat substantially horizontal receptacle having a first opening communicating with the opening in the container, the walls of the receptacle being of heat conducting material and the outer surfaces thereof having high solar heat absorbing properties, a second opening in the receptacle remote from the first opening and communicating with the external atmosphere, a duct interposed between the second opening and the external atmosphere, said duct having a length at least ten times its diameter whereby diffusion of moisture into the receptacle is reduced to a minimum, and a bed of a heat reactible desiccant material in said receptacle intermediate the openings and in heat transfer relationship with said walls.

5. A device for mounting on a container from which moisture is to be excluded between a breather opening in the container and the external atmosphere comprising a flat substantially horizontal receptacle having a first opening near its center communicating with the opening in the breather opening and a second opening near its outer edge communicating with the external atmosphere, the walls of the receptacle being of heat conducting material and the outer surface thereof having high solar heat absorbing properties, a duct interposed between the second opening and the atmosphere, said duct extending below the receptacle and opening to the atmosphere near the center of the receptacle, said duct having a length at least ten times its diameter whereby diffusion of moisture into the receptacle is reduced to a minimum, and a heat reactible desiccant material in said receptacle in heat exchange relationship with said walls.

ELMER B. DUNKAK.

REFERENCES CITED

The following references are of record in the file of this patent:

UNITED STATES PATENTS

| Number | Name | Date |
| --- | --- | --- |
| 430,762 | Taylor | June 24, 1890 |
| 1,556,865 | Müller | Oct. 13, 1925 |
| 1,601,308 | Hill | Sept. 28, 1926 |
| 1,759,971 | Austin | May 27, 1930 |
| 1,841,691 | Wilson | Jan. 19, 1932 |
| 2,138,684 | Altenkirch | Nov. 29, 1938 |
| 2,138,689 | Altenkirch | Nov. 29, 1938 |
| 2,138,690 | Altenkirch | Nov. 29, 1938 |
| 2,138,691 | Altenkirch | Nov. 29, 1938 |